(12) United States Patent
Gross (10) Patent No.: US 11,352,145 B2
(45) Date of Patent: Jun. 7, 2022

(54) FASTENING SYSTEM FOR PASSENGER SEATS IN A CABIN OF A VEHICLE

(71) Applicant: Airbus Operations GmbH, Hamburg (DE)

(72) Inventor: Claus-Peter Gross, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 236 days.

(21) Appl. No.: 16/520,612

(22) Filed: Jul. 24, 2019

(65) Prior Publication Data
US 2020/0031475 A1     Jan. 30, 2020

(30) Foreign Application Priority Data

Jul. 30, 2018 (DE) ...................... 10 2018 118 345.3

(51) Int. Cl.
    *B64D 11/06*       (2006.01)
    *B64C 1/20*        (2006.01)

(52) U.S. Cl.
    CPC ............ *B64D 11/0696* (2013.01); *B64C 1/20* (2013.01)

(58) Field of Classification Search
    CPC ....... B64D 11/06; B64D 11/0696; B64C 1/18; B64C 1/20; B60N 2/00; B60N 2/0155; B60N 2/01575; B60N 2/01583; B61D 33/0057; B61D 33/0071; B61D 33/0078
See application file for complete search history.

(56) References Cited

U.S. PATENT DOCUMENTS

| 1,701,044 A | 2/1929 | Knaur |
| 2,278,101 A | 3/1942 | Browne |
| 3,930,632 A | 1/1976 | Shigeta et al. |

(Continued)

FOREIGN PATENT DOCUMENTS

| DE | 2364797 A1 | 7/1974 | |
| DE | 102011017752 B4 * | 3/2013 | ........... F16C 33/3831 |

(Continued)

OTHER PUBLICATIONS

German Search Report for Application No. 10 2018 118 345.3, dated Apr. 27, 2021, 10 pages.

(Continued)

*Primary Examiner* — Benjamin P Lee
(74) *Attorney, Agent, or Firm* — Lerner, David, Littenberg, Krumholz & Mentlik, LLP (57) ABSTRACT

A fastening system for passenger seats in a vehicle cabin has two or more guide rails to be integrated into or onto a cabin floor, and a plurality of slides, to be brought into engagement with the guide rails and having a flange for connection to a passenger seat in order to retain the passenger seat on a guide rail. Each guide rail has a profile cross section, perpendicularly to a main axis of extent, having a base region and a supporting region. Each slide has a cavity of complementary design with the profile cross section. The guide rails have a plurality of transverse openings spaced apart from one another between the base region and the supporting region. At least one slide has a displaceably mounted retaining body which, when the slide is in engagement with the guide rail, can be brought into engagement with one of the transverse openings.

15 Claims, 8 Drawing Sheets

(56) References Cited

U.S. PATENT DOCUMENTS

| | | | | |
|---|---|---|---|---|
| 8,074,954 B2 * | 12/2011 | Wilhelm | ............ | B64D 11/0696 |
| | | | | 248/503.1 |
| 8,757,578 B2 * | 6/2014 | Kitamura | ................. | B60N 2/07 |
| | | | | 248/430 |
| 9,565,753 B2 | 2/2017 | Hong et al. | | |
| 10,011,195 B2 * | 7/2018 | Kume | ................. | B60N 2/0722 |
| 10,059,230 B2 * | 8/2018 | Kume | ...................... | A47C 1/12 |
| 10,220,731 B2 * | 3/2019 | Kume | ................. | B60N 2/0715 |
| 10,906,430 B2 * | 2/2021 | Dry | .................... | B60N 2/01566 |
| 10,913,536 B2 * | 2/2021 | Mochizuki | ................ | B64C 1/20 |
| 2007/0065248 A1 * | 3/2007 | Legeay | ............. | B60N 2/01575 |
| | | | | 410/105 |
| 2008/0191115 A1 * | 8/2008 | Stubbe | ............... | B64D 11/0696 |
| | | | | 248/503.1 |
| 2011/0062286 A1 * | 3/2011 | Pinkal | ............... | B64D 11/0696 |
| | | | | 244/122 R |
| 2011/0309195 A1 * | 12/2011 | Bishop | ..................... | B64C 1/20 |
| | | | | 244/118.6 |
| 2013/0020459 A1 * | 1/2013 | Moriyama | ............... | B60N 2/01 |
| | | | | 248/636 |
| 2017/0259925 A1 * | 9/2017 | Olulana | .................... | B64C 1/20 |
| 2017/0334564 A1 * | 11/2017 | Born | ..................... | B23K 20/103 |
| 2018/0086230 A1 * | 3/2018 | Kume | ................... | B60N 2/0715 |
| 2018/0086231 A1 * | 3/2018 | Kume | .................. | B60N 2/0722 |
| 2018/0134182 A1 | 5/2018 | Hoshide et al. | | |
| 2018/0194476 A1 * | 7/2018 | Gross | ................. | B64D 11/0696 |
| 2019/0308736 A1 * | 10/2019 | Gross | ................. | B64D 11/0639 |
| 2019/0315473 A1 * | 10/2019 | Mochizuki | ......... | B64D 11/0696 |
| 2019/0345963 A1 * | 11/2019 | Mochizuki | ............ | F16B 7/0473 |

FOREIGN PATENT DOCUMENTS

| | | | | |
|---|---|---|---|---|
| DE | 10 2009 004 987 B4 | 5/2014 | | |
| DE | 10 2013 103 662 A1 | 10/2014 | | |
| DE | 102016208469 A1 | 12/2016 | | |
| DE | 102016111999 A1 | 1/2018 | | |
| DE | 102018108190 A1 * | 10/2019 | ......... | B64D 11/0639 |
| DE | 102018108190 A1 | 10/2019 | | |
| EP | 3296206 A1 | 3/2018 | | |
| EP | 3549863 A1 * | 10/2019 | ......... | B60N 2/01516 |
| JP | 2007196843 A | 8/2007 | | |
| KR | 101676579 B1 | 11/2016 | | |
| WO | WO-2018116926 A1 * | 6/2018 | ................ | F16B 1/02 |

OTHER PUBLICATIONS

Search Report inlcuding Written Opinion for French Application No. FR1908190 dated May 18, 2021; 7 pages (p. 7 categorizing the cited references).

* cited by examiner

FASTENING SYSTEM FOR PASSENGER SEATS IN A CABIN OF A VEHICLE

FIELD OF THE INVENTION

The invention relates to a fastening system for passenger seats in a cabin of a vehicle, to a passenger seat system for a cabin of a vehicle and to a vehicle having a cabin.

BACKGROUND OF THE INVENTION

Floor rails for fastening passenger seats and other devices in variable positions are often used in vehicles that serve to carry passengers. The floor rails can have fastening means which are arranged in a certain grid pattern. The grid pattern makes it possible to implement different fastening positions on the floor rails. Fastening the relevant object in a desired position is generally accomplished by means of a retaining device, which performs positive and/or nonpositive retention with fastening means of the floor rail.

There is furthermore a known practice, especially in aircraft, of determining and, optionally, occasionally or regularly changing a spacing between successive seats in a longitudinal direction, according to preference or temporary requirements. For this purpose, the retaining devices of relevant seats are released, and the seats are then moved along the floor rail and the retaining devices are locked again. Changing the spacing, particularly between two passenger seats arranged in succession, can change the seating class of the relevant section in the passenger compartment. The use of sliding guides with guide rails for easier movement is known.

DE 10 2009 004 987 B4 shows a movable seat for a means of transport, having a seat frame for movable mounting on a support structure of the means of transport, wherein the seat is embodied in such a way that two seats arranged in succession in the means of transport have a smaller common area in a stored state, in which they are pushed together and at least partially into one another, than in a state of use, in which they are pushed apart.

DE 10 2013 103 662 A1 shows a holding device for fastening passenger seats in a means of transport, said device having a seat leg fixing element, a sliding element and a rail element.

BRIEF SUMMARY OF THE INVENTION

The use of guide rails generally requires bores on an upper side of the guide rails, said bores being adapted to the respective position of the vehicle seats moved on the guide rails and being able to be introduced into the retaining elements. The bores can be susceptible to contamination which could enter the bores when the covering is detached or when the passengers seats are moved.

Aspects of the invention propose a fastening system for passenger seats having a guide rail in a cabin of a vehicle, in which contamination can be excluded as far as possible.

A fastening system for passenger seats in a cabin of a vehicle is proposed, the fastening system having two or more guide rails that can be integrated into or onto a floor of the cabin, and a plurality of slides, which can be brought into engagement with the guide rails and which have a flange for connection to a passenger seat in order to retain the relevant passenger seat on a guide rail, wherein each guide rail has a profile cross section, perpendicularly to a main axis of extent, which has a base region and a supporting region, wherein each slide has a cavity, which is of complementary design with the profile cross section of the guide rail, wherein the guide rails have a plurality of transverse openings spaced apart from one another between the base region and the supporting region, and wherein at least one slide has at least one movably mounted retaining body which, when the slide is in engagement with the guide rail, can be brought into engagement with one of the transverse openings.

Within the meaning of the invention, a guide rail is an elongate component which can be arranged on or in a floor of a cabin of the relevant vehicle. The guide rail can be connected directly to a structure supporting the floor. As an alternative, a guide rail can also be connected to floor rails, which are connected to the structure supporting the floor. In the latter case, a guide rail can also be retrofitted in a vehicle by equipping the existing floor rails therewith. For this purpose, the guide rail is screwed onto a floor rail or fastened in some other way.

The guide rails are provided for the purpose of guiding the slide along a predetermined direction of movement and of introducing all the loads associated with passenger seats supported by the slide into the guide rails. Consequently, the guide rails should be configured in such a way that they can be connected firmly to a floor structure along their entire length and are mechanically capable of absorbing all the loads which occur.

The guide rails have a profile cross section which is considered perpendicularly to the main axis of extent thereof for explaining the advantages according to aspects of the invention. This profile cross section could preferably be symmetrical, but this is not necessarily required. The profile cross section is distinguished by two significant regions, which are referred to as the base region and the supporting region. The base region is provided for the purpose of forming a base for the guide rail which can be connected to another device. For instance, it could have connecting means which allow connection to a structure and/or to a floor rail. In a simple case, the base region can have a flat shape and can be embodied in the form of a flange or chord, for example, as in the case of steel profiles. The supporting region, for its part, is provided for the purpose of projecting into the cabin in order to bring about engagement with the slide there. The section lying between the supporting region and the base region can be shaped in any desired manner depending on requirements. The supporting region and the base region do not necessarily have to have the same width, but rather may also be shaped differently for the engagement of the slide. In addition, the section lying in between can also have an undercut which allows an engagement.

The guide rails are furthermore configured for the purpose of guiding a slide along their extent such that the passenger seats can be retained precisely at possible positions along the longitudinal direction of the cabin. Various variants are suitable for this purpose. For example, the guide rail can produce a sliding guide together with edges of the cavity of the slide. The guide is thereby mechanically very simple and robust. In order to reduce the required forces during the movement of the slide and to prevent tilting, rollers can also be used.

The retaining body serves for fixing the slide on the guide rail in the desired position at which a corresponding transverse opening is located. It can have virtually any shape which provides with the capability of being moved into a transverse opening of the guide rail and out of said transverse opening. In a particularly simple case, the retaining body can have an elongate shape, in particular with a substantially constant profile cross section. The retaining body could preferably be moved parallel to the floor. Of course, the transverse openings of the guide rail should be configured in a complementary manner with respect to the retaining body so that the retaining body is easily movable in the relevant transverse opening. A covering of the transverse openings by a covering element is not necessarily required since said transverse openings are substantially protected by their position and orientation against contamination.

In an advantageous embodiment, the transverse openings have an elongate profile which extends substantially completely through the relevant guide rail. The elongate profile can be approximately in the shape of a slot-like transverse opening. The profile should be understood in the context as meaning a profile cross section which, parallel to a main direction of extent of the guide rail, extends transversely with respect thereto through the body of the guide rail. Said body can be based on the basic shape of a rectangle with a slender form and can have, for example, rounded corners.

In a further advantageous embodiment, the guide rails each have at least one undercut which is arranged between the supporting region and the base region, wherein the cavity of the slide has a necked region, thus enabling the supporting region to be enclosed by the cavity of the slide, and wherein each slide has at least one rotatably mounted roller, which projects into the necked region and can be brought into surface contact with a surface of the guide rail. The slide is guided by the at least one rotatably mounted roller. The latter projects into the necked region of the cavity and can therefore be brought into surface contact with the surface of the guide rail. The necked region can be brought loosely into engagement with the undercut here. The surface contact relates here to contact between the circumferential surface of the at least one roller and the surface of the supporting region. The requirement for surface contact leads to a mutually matched configuration particularly of the supporting region and the contour of the circumferential surface of the relevant rollers. By virtue of the surface contact, the roller is made to rotate as the slide is moved along the main direction of extent of the guide rail, and thus the roller runs along the guide rail. In addition, the use of a roller allows the defined introduction of forces into the guide rail via the relevant surface contact. Through selection of the size of the relevant roller, the characteristics and geometrical configuration of the surface thereof, the number of rollers used and the alignment thereof with respect to the supporting region, it is possible to determine the level of forces to be transmitted. At the same time, the frictional forces can be significantly reduced. Moreover, such a configuration is significantly more robust in respect of deviations from component dimensions and contamination.

The transverse openings preferably extend completely through the guide rail. As a result, any contamination which occurs can be pushed out of the transverse openings by a retaining body. The retaining body here is preferably configured in such a manner that it fills an entire transverse opening. Its movement path consequently corresponds at least to the length of the relevant transverse openings.

The slide preferably has a bearing device for the displaceable bearing of the retaining body, wherein the retaining body has an elongate end and an engagement element, wherein the engagement element points toward the transverse opening, and wherein the elongate end projects visibly from the bearing device in a released position of the retaining body and does not project over the bearing device in a retaining position. The elongate end can preferably end flush with an outer surface of the bearing device when the retaining body is in its non-locked position. In the neutral position, the retaining body already significantly stands out visually. An indicator function can be achieved by the elongate end which faces away from the transverse opening when the slide is placed on the guide rail. Accordingly, a user can very easily identify whether retention has been implemented successfully. This can be enhanced even further by visually conspicuous colouring. It is conceivable to provide the elongate end with a bright colour, e.g. yellow, orange, red or a neon colour.

To simplify the locking, it is particularly advantageous if the retaining body is a sprung pin, which is urged by a spring force into a retaining position. By this means, the retaining body is always urged into a position retaining the slide. The retaining body can have a corresponding step or a stop surface for surface contact with a spring. If the relevant passenger seat or the relevant passenger seat group is intended to be moved along the guide rail, the retention can be eliminated by releasing the retaining body from the neutral position in order then to move the passenger seat or the passenger seat group. During the moving process, the retaining body can be prevented from snapping into a transverse opening by a corresponding catch or by manual action on the retaining body, e.g. via a Bowden cable or the like. When the relevant slide reaches its predetermined position, the retaining body can snap into a transverse opening again. For this purpose, the temporary catch retention thereof must be cancelled.

Particularly preferably, the transverse openings have a step and a tapered outlet opening, wherein the outlet opening of at least one of the transverse openings is oriented in a laterally reversed manner to the other of the transverse openings, and wherein the retaining body is designed to be brought into engagement exclusively with a region of the transverse opening than faces away from the tapered outlet opening. It is thus possible to use a plurality of slides along a guide rail, the retaining bodies of which are arranged on different sides of the slide in order in each case to be facing one of two different lateral sides of the guide rail. As a result, the retaining bodies can only be brought into engagement with a transverse opening when the latter is oriented correctly, and therefore a larger opening contour faces the retaining body and a tapered outlet opening faces away from the retaining body. Grid patterns for achieving different seat spacings can thus be arranged on two different sides of the guide rail, and therefore possible regions for retaining positions of seats lying in succession can also overlap and, nevertheless, in the event of a different lateral orientation of retaining bodies, a precise retaining position can be achieved for every desired seat spacing.

In an advantageous embodiment, the profile cross section of the guide rail has two mutually opposite undercuts. In particular a symmetrical profile cross section can thereby be implemented. The load to be introduced from a passenger seat or a passenger seat group onto the guide rail can therefore take place symmetrically at each slide if the profile cross section is in contact with the slide on both sides.

The slide could have two mutually spaced rollers for each undercut, which can each be brought into surface contact with the surface of the guide rail. If the profile cross section has two undercuts, the slide can have, for example, at least four rollers. Both pairs of rollers, which in each case could consist of two rollers arranged spaced apart from each other along the main direction of extent, lead to precise alignment of the slide relative to the guide rail. Consequently, there can be at least 16 rollers for each passenger seat or passenger seat group implemented on a single frame if each foot of the relevant frame is equipped with an individual slide.

All the rollers could be arranged on a common plane and could be mounted so as to be rotatable about an axis which is perpendicular to the common plane. When using a total of four rollers, the common plane can run parallel to the floor on which the fastening system is arranged. When considered vectorially, the movement of the circumferential surface of each roller is accordingly likewise in this plane. It is thereby possible to implement a flat side.

Furthermore, the roller could have a circumferentially running groove which is matched to a contour of the surface of the guide rail. The groove allows force transmission in a direction which corresponds to the extent of the axis of rotation of the respective roller. While force transmission in the radial direction is already achieved by the circumferential surface of each roller, the groove in combination with the supporting region can lead to force transmission in the axial direction. Each of the rollers of a slide is preferably provided with a groove of this kind.

The slide preferably has at least one projection, which projects into the necked region and forms a clearance fit with the undercut. Safety during the use of the fastening system according to the invention is thereby enhanced. In the unlikely event of a mechanical impairment of one of the rollers, the projection can enter into a positive connection with the guide rail. During the normal state, in which the guide rail is engaged by all of the surrounding rollers, the projection does not cause an obstruction, however, owing to the clearance fit. In each position of the slide along the main direction of extent of the guide rail, it is then at a certain distance from the surface of the guide rail and consequently cannot impair a sliding movement.

The invention furthermore relates to a passenger seat system for a cabin of a vehicle, which has at least one passenger seat device having a frame, and a fastening system in accordance with the above description, wherein the fastening system has two mutually spaced guide rails running parallel to each other, wherein the seat frame of the at least one passenger seat device has two pairs of mutually spaced seat legs, which are each connected to one slide, and wherein the slides are in engagement with the guide rails.

As already mentioned above, the guide rails in the passenger seat system can be capable of being fastened on seat rails arranged in a floor of a cabin of the vehicle.

Finally, the invention relates to a vehicle having a cabin, a cabin floor and at least one passenger seat system of this kind.

The vehicle is preferably an aircraft, in particular a passenger aircraft.

BRIEF DESCRIPTION OF THE DRAWINGS

Further features, advantages and possible uses of the present invention will be found in the following description of the exemplary embodiments and the figures. Here, all the features described and/or depicted, in themselves and in any desired combination, form the subject matter of the invention, even when considered independently of their combination in the individual claims or the dependency references thereof. In the figures, the same reference signs furthermore stand for identical or similar objects.

DETAILED DESCRIPTION

Figure 1:
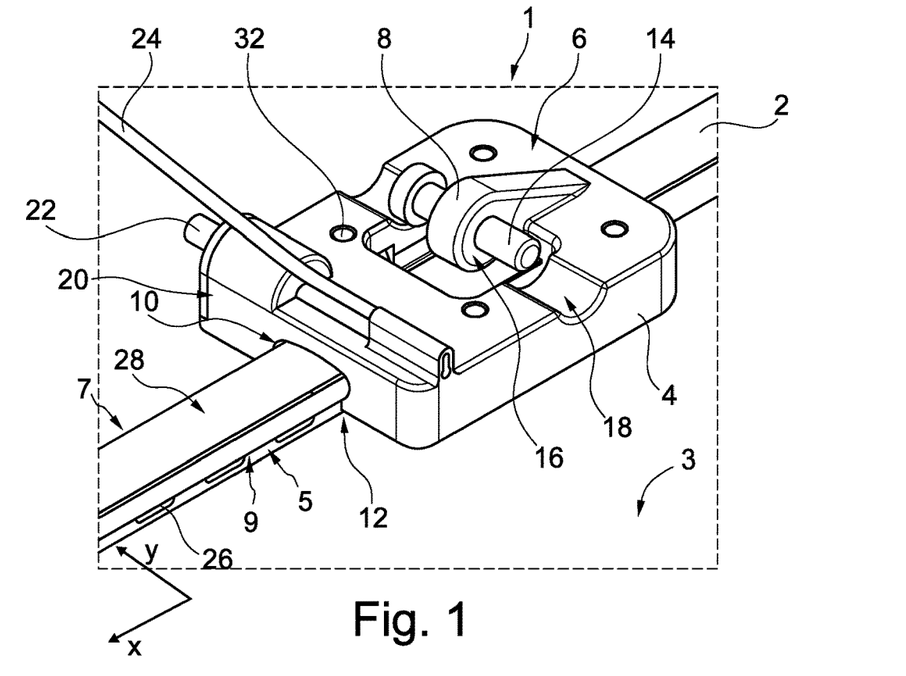
FIGS. 1 to 3 show a three-dimensional view of a fastening system with a non-retained slide with different degrees of transparency of the slide.

FIG. 1 shows a fastening system 1 having a guide rail 2 which is positioned on a floor 3 of a cabin and has a slide 4 arranged thereon for supporting a passenger seat (not illustrated). The slide 4 has, by way of example, an approximately square basic shape with rounded corners and has, on an upper side 6, a flange 8 for fastening a passenger seat. In addition, the slide 4 has a cavity 10, which extends along a longitudinal axis x which is a main direction of extent of the guide rail 2. The possible configuration thereof is illustrated in subsequent figures. The guide rail 2 has a profile cross section, perpendicularly to the main axis of extent x, which has a base region 5 and a supporting region 7. The base region 5 is the lower region of a guide rail 2 and can be connected to the floor 3, to a floor rail (not shown) located below the latter or to a structure of the vehicle. The supporting region 7 projects into the cabin and serves for receiving the slide 4. An undercut 9 is arranged between the base region 5 and the supporting region 7.

In this illustration, it can be seen that the cavity 10 has a profile cross section, which has a necked region 12. This means that the profile cross section is narrower on an underside, which faces away from the flange 8, than on regions further towards the upper side 6, which are closer to the flange 8. This is matched to the profile cross section of the guide rail.

By way of example, the flange 8 has a ring shape in regions and can be fastened to a fork (not shown) of a seat foot of a passenger seat. For this purpose, for example, a bolt 14 could extend through the fork and an opening 16 of the flange 8. Of course, other variants are also possible. The opening 16 extends in a transverse direction y, which runs parallel to the floor and extends perpendicularly to the longitudinal axis x. The opening 16 is supplemented in the transverse direction y by recesses 18 into which the seat foot can extend and which also allow the application of a tool for tightening the bolt 14.

In addition, a retaining body 20 runs in the transverse direction y and is movable in the transverse direction y. An elongate end 22 of the retaining body 20, that projects significantly over the slide 4 and indicates a released position to a user, can be seen in FIG. 1. This can also be enhanced by the fact that the elongate end 22 is provided with a conspicuous colour which is otherwise not used in the area close to the slide 4.

The retaining body 20 is connected to a Bowden cable 24, which is coupled to an actuating means (not illustrated). The retaining body 20 can thereby be moved in the transverse direction y and can take up a released position or a retaining position here. Said positions are illustrated in somewhat more detail in the following figures.

The guide rail 2 has a row of transverse openings 26 which are arranged in succession along the longitudinal direction x and are spaced from one another. It is conceivable to arrange the transverse openings 26 in a certain grid pattern and to provide the spacings to be always identical or in a certain pattern. The transverse openings 26 are provided for the purpose of entering into a positive connection with the retaining body 20. By means of said connection, the slide 4 is secured at the positions provided by the relevant transverse opening 26. Consequently, the slide 4 can be moved along the guide rail 2 and retained laterally by the retaining body 20. The position of the slide 4 and therefore of the seat foot arranged thereon therefore continues to exist until the retaining body 20 is released again. For this purpose, a corresponding actuating means has to be actuated.

To protect the guide rail 2 against contamination and mechanical stressing by shoes and hand luggage, a covering 28 is provided which is adhesively bonded in the form of a strip of carpet or the like onto the guide rail 2. The profile cross section of the guide rail 2 and of the cavity 10 are adapted to each other in such a manner that the slide 4 is movable gently along the guide rail 2 despite the covering 28.

Figure 2:
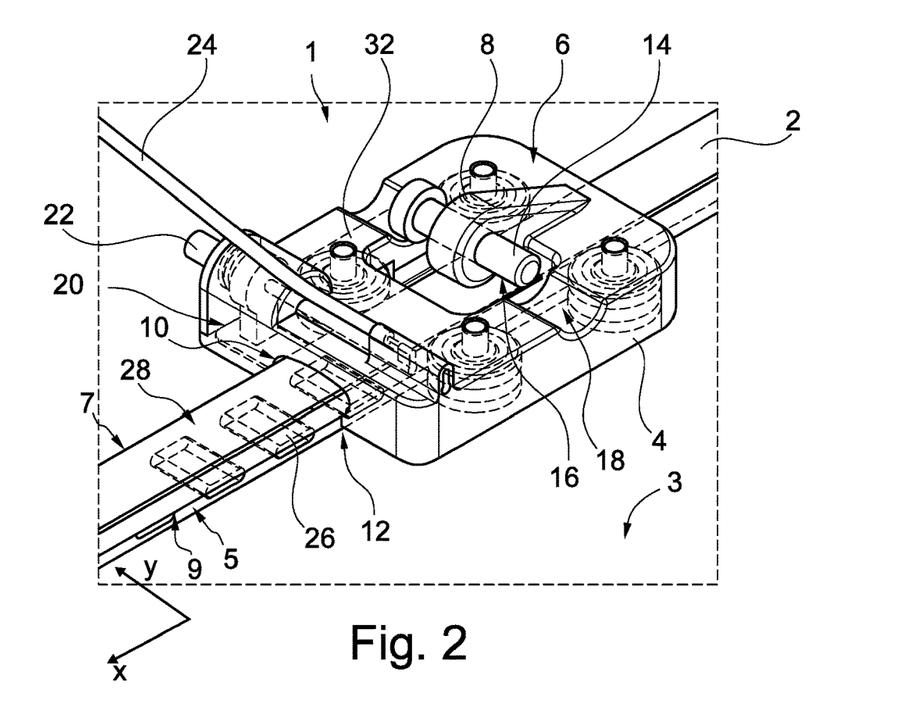

FIG. 2 shows a partially transparent illustration of the slide 4, in which two pairs of rollers 30 can be seen which are mounted rotatably on axles 32 on the slide 4. The rollers 30 circumferentially have grooves 34 which are in surface contact with bulges 36 of the guide rail 2. The rollers 30 are aligned in such a way that they lie in the x-y plane. They can therefore enclose the guide rail 2, which runs along the x axis in the cavity 10, in pairs. Guiding along the x axis is thereby undertaken. The guiding has very low friction and nevertheless can absorb very high forces.

Furthermore, an elongate connecting element 36 is apparent which couples the Bowden cable 24 to the retaining body 20 which, in this illustration, is likewise present in a non-locked position, and therefore the elongate end 22 projects significantly out of the slide 4. The retaining body 20 is, by way of example, mounted movably in a bearing device 38 and has a locking body 40 which runs perpendicularly to the x and y direction and has an engagement element 42 formed parallel to the x and y direction. The profile cross section of said engagement element is adapted to that of the transverse openings 26, and therefore, by moving the connecting element 36, the locking body 40 is moved in the y direction and, in the process, pushes the engagement element 42 into, or pulls same out of, the transverse opening 26. Consequently, the engagement of the engagement element 42 in a transverse opening 26 leads to locking.

Figure 3:
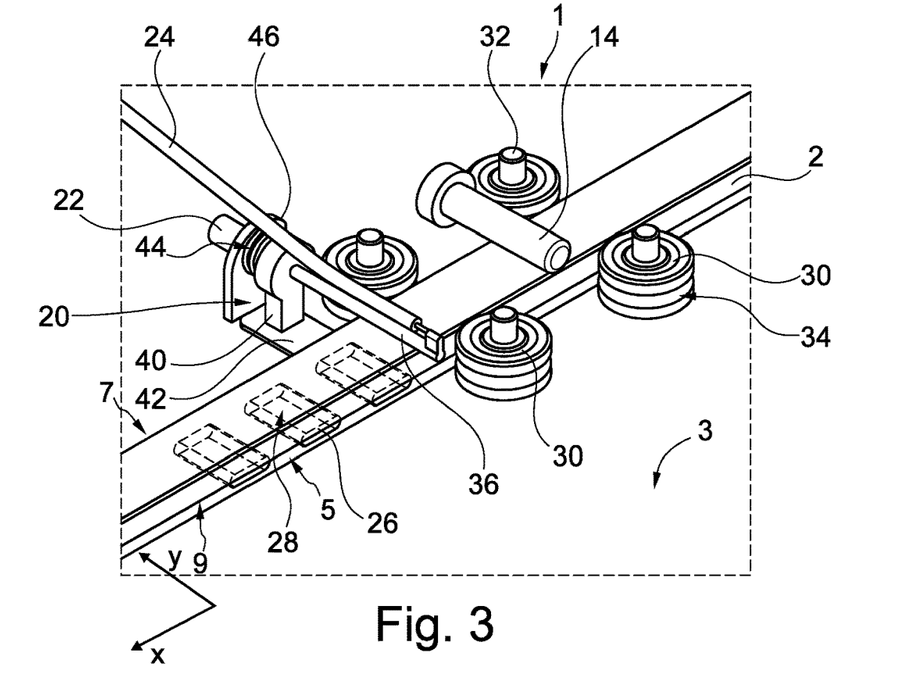
Figure 4:
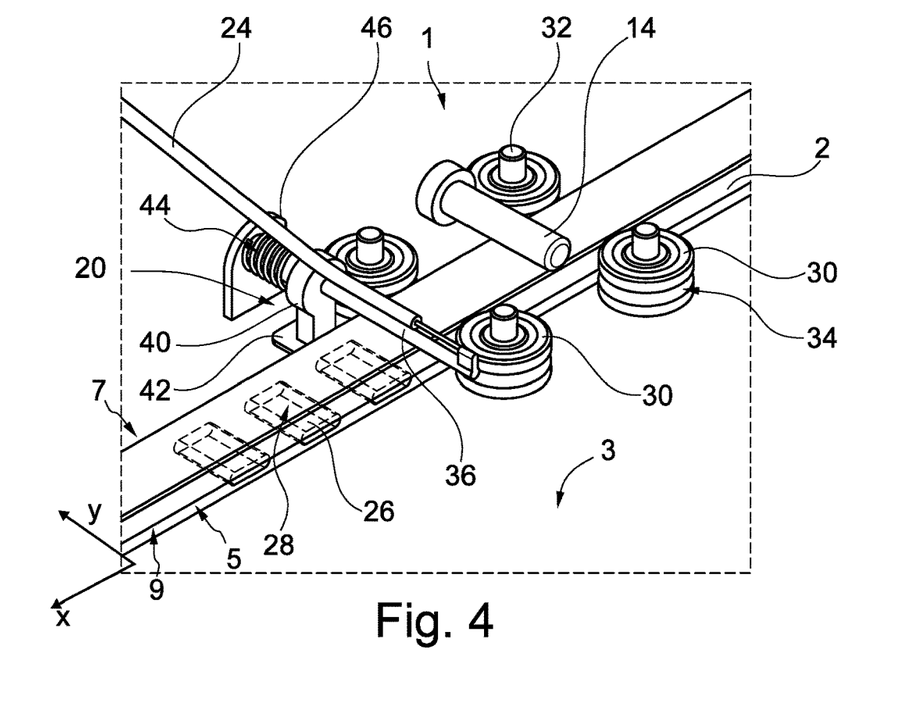
FIGS. 4 to 7 show the fastening system in different views with a retained slide.

FIG. 3 shows the components of the slide 4 in their three-dimensional arrangement. FIG. 3 corresponds approximately to FIG. 1, but a housing of the slide 4 is hidden. In FIG. 3, the retaining body 20 is in a non-locked position while a retaining position is shown in FIG. 4. A spring element 44 which always urges the retaining body 20 into its retaining position can be seen particularly clearly here. For this purpose, the spring element 44 is arranged between an outer wall 46 and the locking body 40 and is pretensioned in such a manner that the locking body 40 is always pushed away from the outer wall 46.

Figure 5:
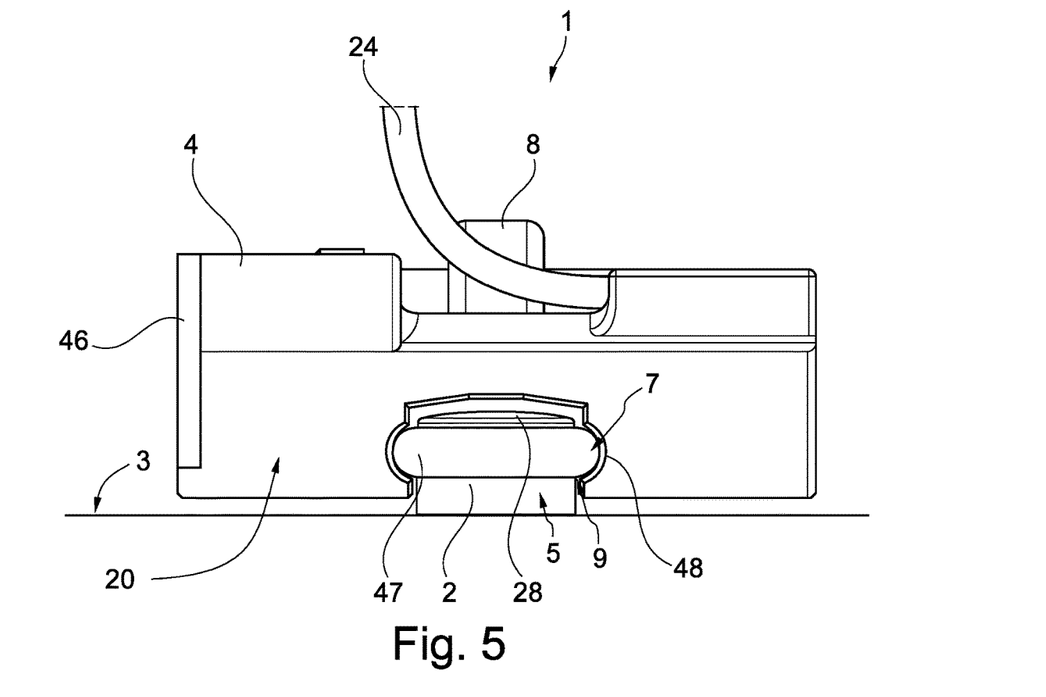

FIG. 5 shows a front view of the slide 4 and the profile cross section, located therein, of the cavity 10, and also the necked region 12. The guide rail 2 is shaped in such a manner that the bulges 47 run on both sides in the y direction and extend on both sides into correspondingly shaped indentations 48 above the necked region 12. As a result, even in the event of a highly unlikely failure of a roller 30, the slide 4 can be held on the guide rail 2.

Figure 6:
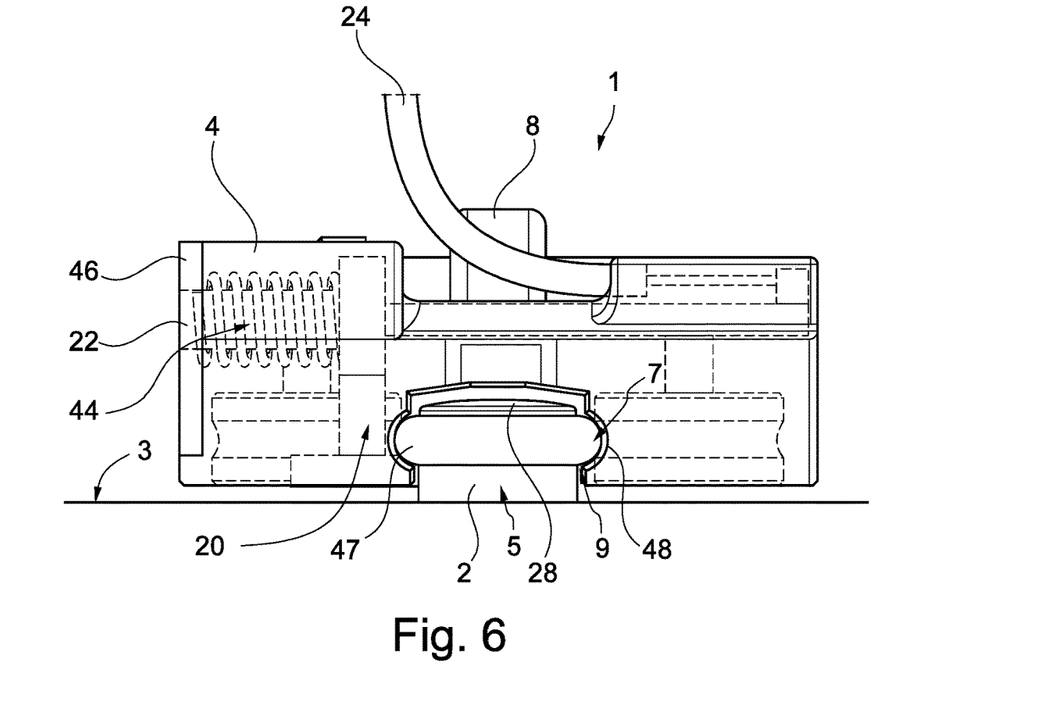
Figure 7:
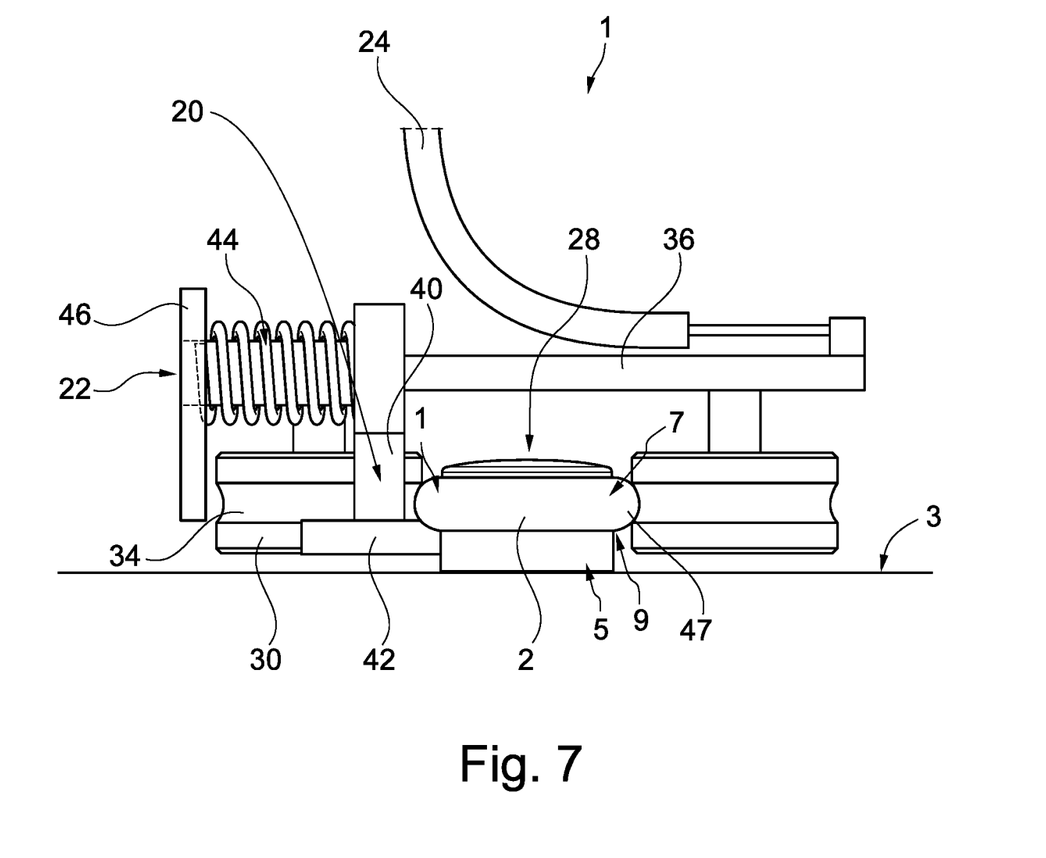

Merely for the sake of completeness, FIG. 6 shows a partially transparent illustration of FIG. 5, and FIG. 7 shows a completely transparent housing of the slide 4. FIGS. 5 to 7 show a retaining position in which the retaining element 20, or the engagement element 42 formed thereon, is inserted in a transverse opening 26.

Figure 8:
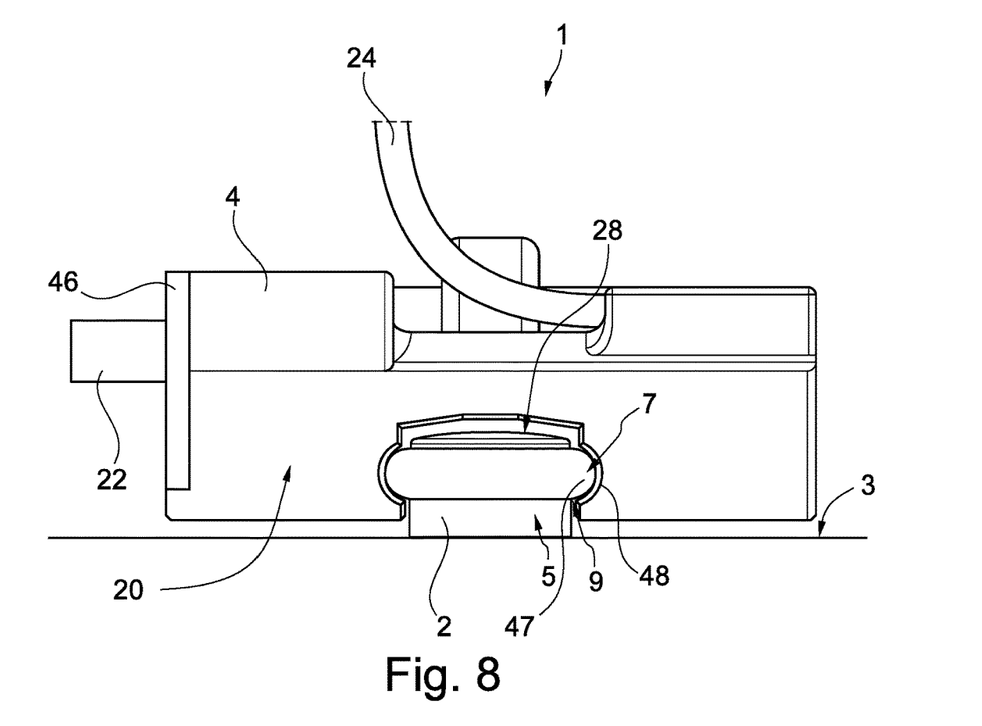
FIGS. 8 to 10 show front views of the slide with different degrees of transparency of the slide and with the slide not retained.
Figure 9:
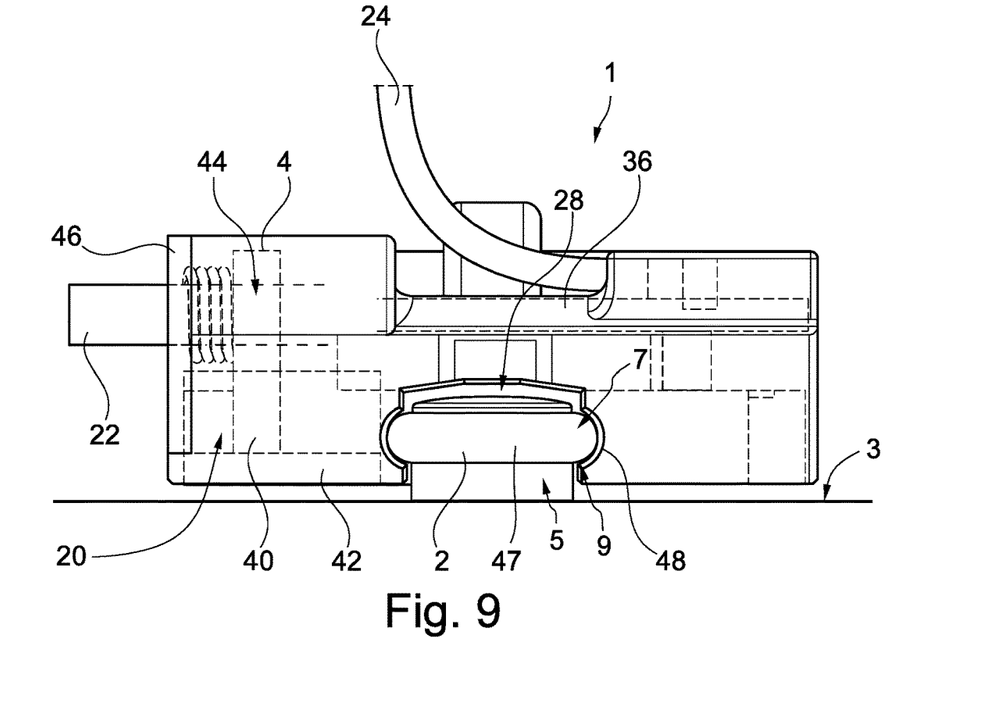
Figure 10:
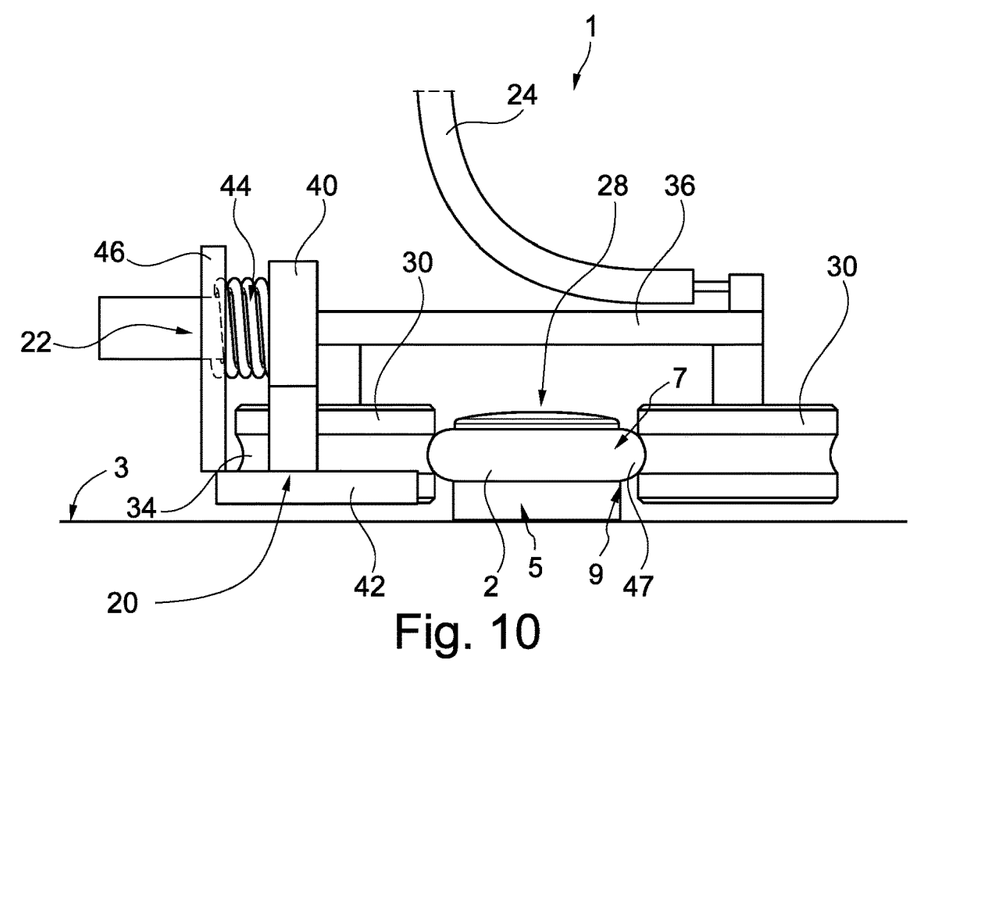

FIGS. 8, 9 and 10 show, analogously to FIGS. 5, 6 and 7, a front view and a partially transparent illustration and with a completely transparent housing, in which the retaining element 20 is present in a non-retained position. The elongate element 22 projects outwards significantly over the slide 4 and can easily be seen by a user. If locking of the passenger seats at a new position is intended to be carried out, all the retaining bodies 20 have to be latched in a corresponding transverse opening 26. All the elongate ends 22 should therefore no longer be visible from the outside. Should a user nevertheless see one such end, the corresponding passenger seat or the Bowden cable 24 would have to be moved in order to carry out latching.

Figure 11:
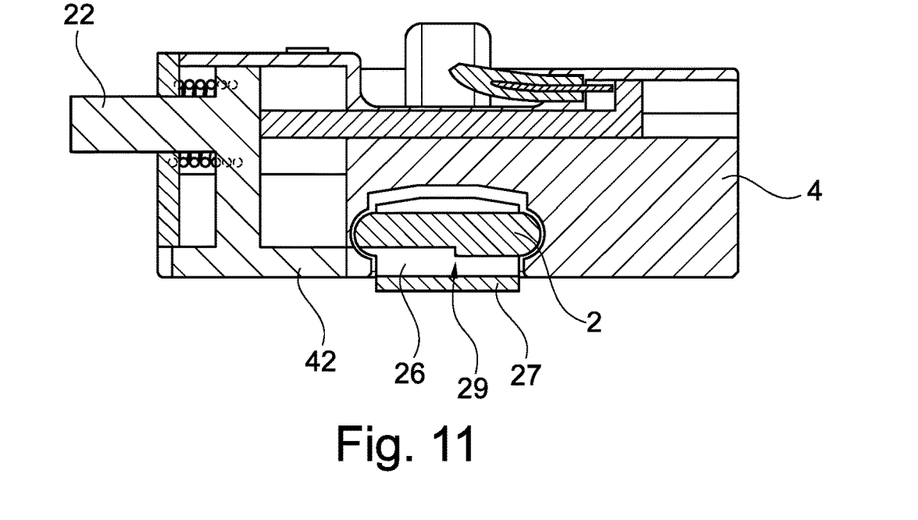
FIGS. 11 to 16 show different views of a slide having different transverse openings.
Figure 12:
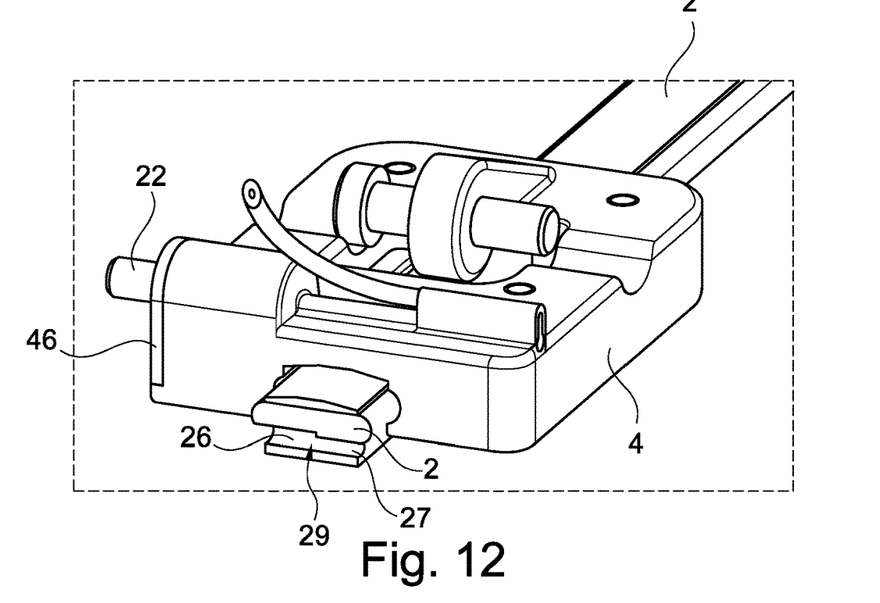

The transverse openings 26 shown above are designed to receive engagement elements 42. In particular cases, in order to prevent confusion, it may be required to arrange transverse openings 26 provided for certain passenger seats in such a manner that only a predetermined partial quantity of the transverse openings 26 can be used. As illustrated in FIGS. 11 and 12, the transverse openings 26 could be configured by way of example in such a way that said transverse openings are tapered by a step 29 in the interior of the guide rail 2 to an outlet opening 27. By positioning all the transverse openings 26 having the larger opening contour on a common first lateral side of the guide rail 4 and, for certain passenger seats, on the opposite second lateral side of the guide rail 2, the associated slide 6 of said certain passenger seats can be brought into engagement exclusively into the larger opening contours on the second lateral side.

The transverse openings 26 consequently have different dimensions on both sides of the guide rail 2. The engagement element 42 is designed to be pushed into just the side of the transverse opening 26 that has an enlarged opening contour. This is the left side of the guide rail 2 in the plane of the drawing of FIG. 11. The advantage consists in that certain passenger seats which are to be fastened on the guide rail 2 are only retainable at certain transverse openings 26. This can increase the position accuracy if a plurality of very closely adjacent transverse openings 26 lead to overlapping position regions of the individual passenger seats.

Figure 13:
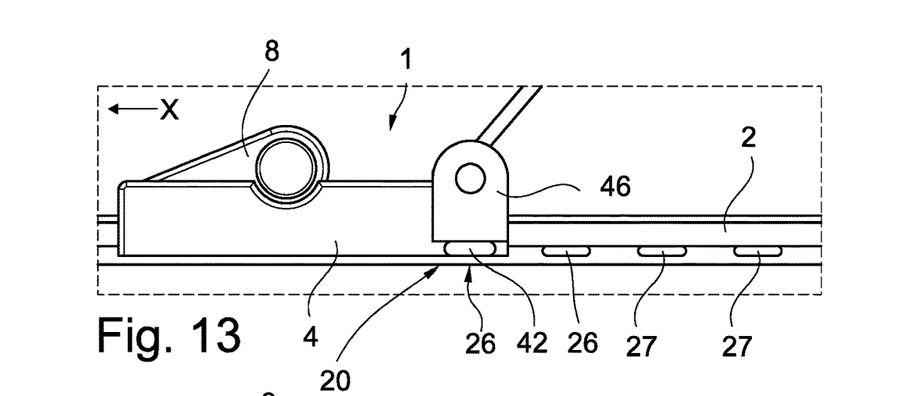
Figure 14:
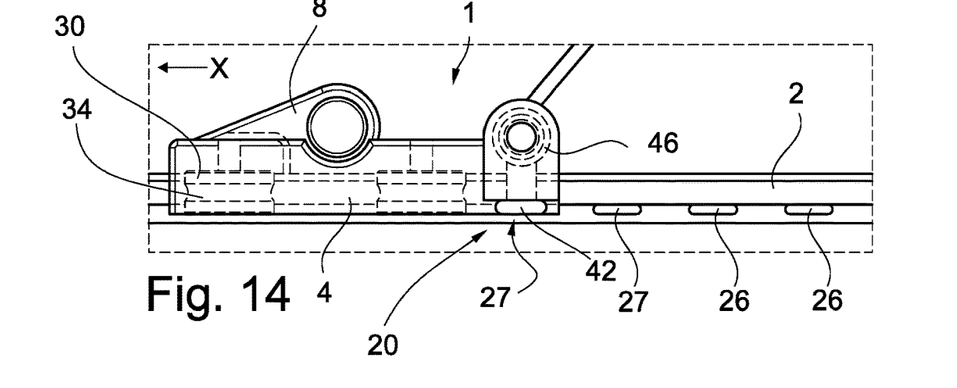

FIGS. 13 and 14 show a side view of the slide 4 on the guide rail 2, wherein, by way of example, the longitudinal direction x runs to the left in the plane of the drawing, and the retaining body 20 is arranged on a left side of the guide rail 2. The transverse openings 26 with a step 29 located therein and with a tapered outlet opening 27 are lined up in such a manner that, for example, two tapered outlet openings 27 follow two transverse openings 26 having a larger opening contour. In FIG. 13, retention can consequently take place only at the two left transverse openings 26. The arrangement is the other way around in FIG. 14. The slide 4 shown there cannot undergo any retention in the current position, i.e. entirely to the left in the plane of the drawing, not even in the directly adjacent, tapered outlet opening 27. Consequently, a user will only be able to undertake a retention in the two following transverse openings 26. The guide rail 2 could be designed in such a manner that, because of overlapping fastening positions for adjacent seats at different seat spacings, for certain seats the transverse openings 26 are correspondingly mirrored along the direction of extent x.

Figure 15:
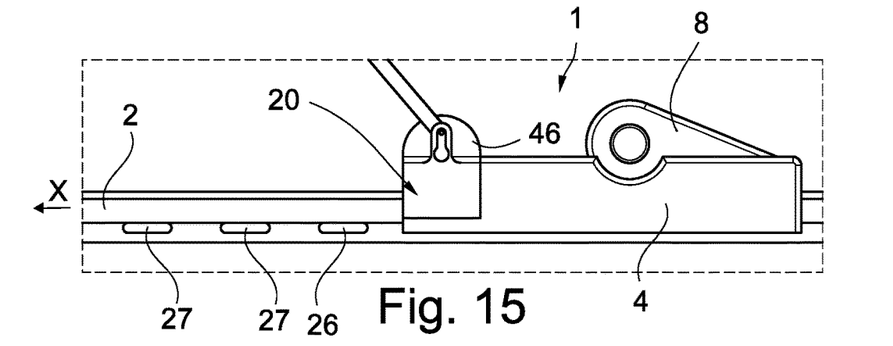
Figure 16:
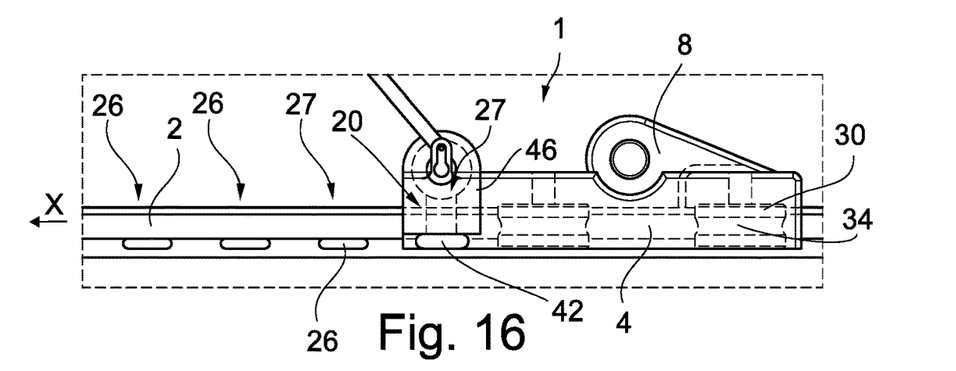

FIGS. 15 and 16 show the arrangement of the retaining body 20 on the right side of the guide rail 2. Two tapered outlet openings 27 are illustrated on the left in the plane of the drawing. Since the retaining body 20 is concealed here by the rail 2, the retaining body 20 can latch only in the two first transverse openings 26 on the left in the plane of the drawing (marked by arrow 26). A tapered outlet opening 27 in each case faces the observer there. At the two positions illustrated on the right in the plane of the drawing, the retaining body 20 is confronted exclusively with tapered outlet openings 27 and cannot latch there. At these points, the transverse openings 26 having a larger opening contour face the observer.

Figure 17:
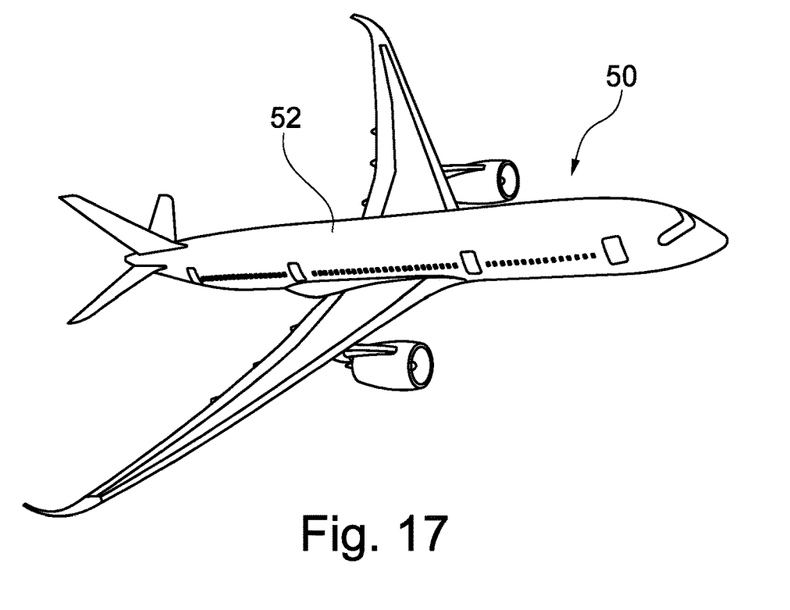
FIG. 17 shows an aircraft in which such a fastening system is arranged.

FIG. 17 shows an aircraft 50 which has a cabin 52, which is equipped with a plurality of such guide rails 2, which extend parallel to the longitudinal axis x of the aircraft 50. By means of such a construction, it is possible to change seat spacings between individual flights and, at the same time, to permit cabin crew to carry out this themselves. Neither expensive tools nor great force are required to move the relevant passenger seats along the longitudinal axis x.

For the sake of completeness, it should be noted that "having" does not exclude any other elements or steps and "a" or "an" does not exclude a multiplicity. It should furthermore be noted that features which have been described with reference to one of the above exemplary embodiments can also be used in combination with other features of other exemplary embodiments described above. Reference signs in the claims should not be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening system for passenger seats in a cabin of a vehicle, comprising:
    two or more guide rails configured to be integrated into or onto a floor of the cabin, and
    a plurality of slides configured to be brought into engagement with one of the two or more the guide rails and having a flange for connection to a passenger seat in order to retain the passenger seat on the one of the two or more guide rail,
    wherein each of the two or more guide rails has a profile cross section, perpendicularly to a main axis of extent, having a base region and a supporting region,
    wherein each of the plurality of slides has a cavity of complementary design with the profile cross section of a corresponding one of the two or more guide rails,
    wherein the two or more guide rails have a plurality of transverse openings spaced apart from one another between the base region and the supporting region, each of said plurality of transverse openings having an opening in a sidewall of the two or more guide rails and extending transverse to a longitudinal axis of the two or more guide rails, and
    wherein at least one slide of the plurality of slides has at least one displaceably mounted retaining body which, when the at least one slide is in engagement with a corresponding one of the two or more guide rails, is configured to be brought into engagement with one of the plurality of transverse openings.

2. The fastening system according to claim 1, wherein the plurality of transverse openings has an elongate profile extending substantially completely through a corresponding one of the two or more guide rails.

3. The fastening system according to claim 1,
    wherein the two or more guide rails have at least one undercut arranged between the supporting region and the base region,
    wherein the cavity of each of the plurality of slides has a necked region, thus enabling the supporting region to be enclosed by the cavity, and
    wherein each of the plurality of slides has at least one rotatably mounted roller projecting into the necked region and configured to be brought into surface contact with a surface of a corresponding one of two or more guide rails.

4. The fastening system according to claim 1, wherein the plurality of transverse openings extend completely through corresponding one of the two or more guide rails.

5. The fastening system according to claim 1,
    wherein the at least one slide of the plurality of slides has a bearing device for a displaceable bearing of the at least one displaceably mounted retaining body,
    wherein the at least one displaceably mounted retaining body has an elongate end and an engagement element, wherein the engagement element points toward a corresponding one of the plurality of transverse openings, and
    wherein the elongate end projects visibly from the bearing device in a non-retained position of the at least one displaceably mounted retaining body and does not project over the bearing device in a retaining position.

6. The fastening system according to claim 1, wherein the at least one displaceably mounted retaining body is a sprung pin urged by a spring force into a retaining position.

7. The fastening system according to claim 1,
    wherein the plurality of transverse openings have a step and a tapered outlet opening,
    wherein the tapered outlet opening of at least one of the plurality of transverse openings is oriented in a laterally reversed manner to another of the plurality of transverse openings, and
    wherein the at least one displaceably mounted retaining body is configured to be brought into engagement exclusively with a region of the at least one of plurality of transverse openings that faces away from the tapered outlet opening.

8. The fastening system according to claim 1, wherein the profile cross section of the two or more guide rails has two mutually opposite undercuts.

9. The fastening system according to claim 3, wherein the at least one slide has two mutually spaced rollers for the at least one undercut, each of the two mutually spaced rollers configured to be brought into surface contact with the surface of a corresponding one of the two or more guide rails.

10. The fastening system according to claim 9,
    wherein the profile cross section of the two or more guide rails has two mutually opposite undercuts, and
    wherein the at least one slide has at least one pair of mutually opposite rollers for engagement in two mutually opposite regions of the profile cross section of a corresponding one of the two or more guide rails.

11. The fastening system according to claim 9, wherein all the rollers are arranged on a common plane and are mounted so as to be rotatable about a respective axis perpendicular to the common plane.

12. A passenger seat system for a cabin of a vehicle, comprising:
- at least one passenger seat device having a seat frame, and a fastening system according to claim 1,
- wherein the fastening system has two mutually spaced guide rails running parallel to each other,
- wherein the seat frame of the at least one passenger seat device has two pairs of mutually spaced seat legs, which are each connected to one slide, and
- wherein the slides are in engagement with the guide rails.

13. The passenger seat system according to claim 12, wherein the guide rails are configured to be fastened on seat rails arranged in a floor of a cabin of the vehicle.

14. A vehicle having a cabin, a floor and at least one passenger seat system according to claim 12.

15. The vehicle according to claim 14, wherein the vehicle is an aircraft.

* * * * *